(12) United States Patent
Snider et al.

(10) Patent No.: US 8,285,997 B2
(45) Date of Patent: Oct. 9, 2012

(54) BACKUP APPARATUS WITH HIGHER SECURITY AND LOWER NETWORK BANDWIDTH CONSUMPTION

(75) Inventors: Lindsay Eugene Snider, Carlisle, PA (US); Ian Kirby Berry, Carlisle, PA (US)

(73) Assignee: Barracuda Networks, Inc., Campbell, CA (US)

( * ) Notice: Subject to any disclaimer, the term of this patent is extended or adjusted under 35 U.S.C. 154(b) by 699 days.

(21) Appl. No.: 12/408,644

(22) Filed: Mar. 20, 2009

(65) Prior Publication Data

US 2010/0241619 A1  Sep. 23, 2010

(51) Int. Cl.
*G06F 17/30* (2006.01)
*G06F 17/00* (2006.01)
*G06F 21/00* (2006.01)
*H04L 9/00* (2006.01)
*H04L 29/06* (2006.01)

(52) U.S. Cl. ........ 713/176; 707/693; 713/193; 713/150; 711/162; 380/277

(58) Field of Classification Search .................. None
See application file for complete search history.

(56) References Cited

U.S. PATENT DOCUMENTS

| | | | |
|---|---|---|---|
| 6,865,655 B1 * | 3/2005 | Andersen | 711/162 |
| 8,117,464 B1 * | 2/2012 | Kogelnik | 713/193 |
| 2003/0065656 A1 * | 4/2003 | de la Torre et al. | 707/3 |
| 2004/0255140 A1 * | 12/2004 | Margolus et al. | 713/193 |
| 2005/0240749 A1 * | 10/2005 | Clemo et al. | 711/170 |
| 2005/0268102 A1 * | 12/2005 | Downey | 713/176 |
| 2008/0310619 A1 * | 12/2008 | Scheidt et al. | 380/28 |
| 2009/0075630 A1 * | 3/2009 | McLean | 455/411 |
| 2010/0058049 A1 * | 3/2010 | Fein et al. | 713/150 |
| 2010/0077171 A1 * | 3/2010 | de la Torre et al. | 711/166 |
| 2010/0083003 A1 * | 4/2010 | Spackman | 713/193 |
| 2010/0095122 A1 * | 4/2010 | Bettger et al. | 713/170 |
| 2011/0173161 A1 * | 7/2011 | de la Torre et al. | 707/687 |

* cited by examiner

*Primary Examiner* — Philip Chea
*Assistant Examiner* — Dorianne Alvarado David
(74) *Attorney, Agent, or Firm* — Patentry

(57) ABSTRACT

A system for more secure, more efficient, more widely applicable backup, retention, and retrieval of data. An apparatus comprising improved means for de-duplication of data and securely storing data remotely with efficient retention and recovery. A method comprising disassembling data objects, efficiently de-duplicating, securely storing and retrieving backups in shared servers on a public network, and controlling retention.

5 Claims, 13 Drawing Sheets

BACKUP APPARATUS WITH HIGHER SECURITY AND LOWER NETWORK BANDWIDTH CONSUMPTION

BACKGROUND

It is known that digital signatures can be used to uniquely identify files. It is known that two files can be compared to identify their differences. It is known that content management systems endeavor to reduce disk consumption by reducing duplication within an enterprise. It is known that offsite backup of essential files are among best practices for data security. It is known that public/private key pairs are used for asymmetric encryption. When one key of a key pair is used to encrypt a message, the other key from that pair is required to decrypt the message. Conventional backup systems provide services for individuals or corporate customers. However bandwidth considerations are more limiting than raw disk capacity. It can be appreciated that a more efficient backup solution would lower duplicative transfers.

SUMMARY OF THE INVENTION

The invention is a method of operating an apparatus for backup, storage, and retention of data objects. The method comprises the following processes distributed across the Internet and local to customers of the apparatus and service. A data object is disassembled into shards. A recipe is determined for reassembling the shards. A fingerprint is computed for each shard and compared with stored fingerprints for stored shards. Shards are encrypted for transmission through a wide area network. A shard is not stored, encrypted, or transmitted if it can be determined from its fingerprint that the shard is duplicative of a previously stored shard. Storage and transmission of encrypted shards require methods for recovery and retention distinguishable from conventional backup and recovery systems. The invention applies to disk images, as well as data objects and files which exceed the capacities of conventional network backup apparatuses and methods.

DETAILED DISCLOSURE OF EMBODIMENTS OF THE INVENTION

The present invention reduces duplicative transfer of data objects including configuration and system setting necessary for complete backup in addition to file recovery.

Figure 1:
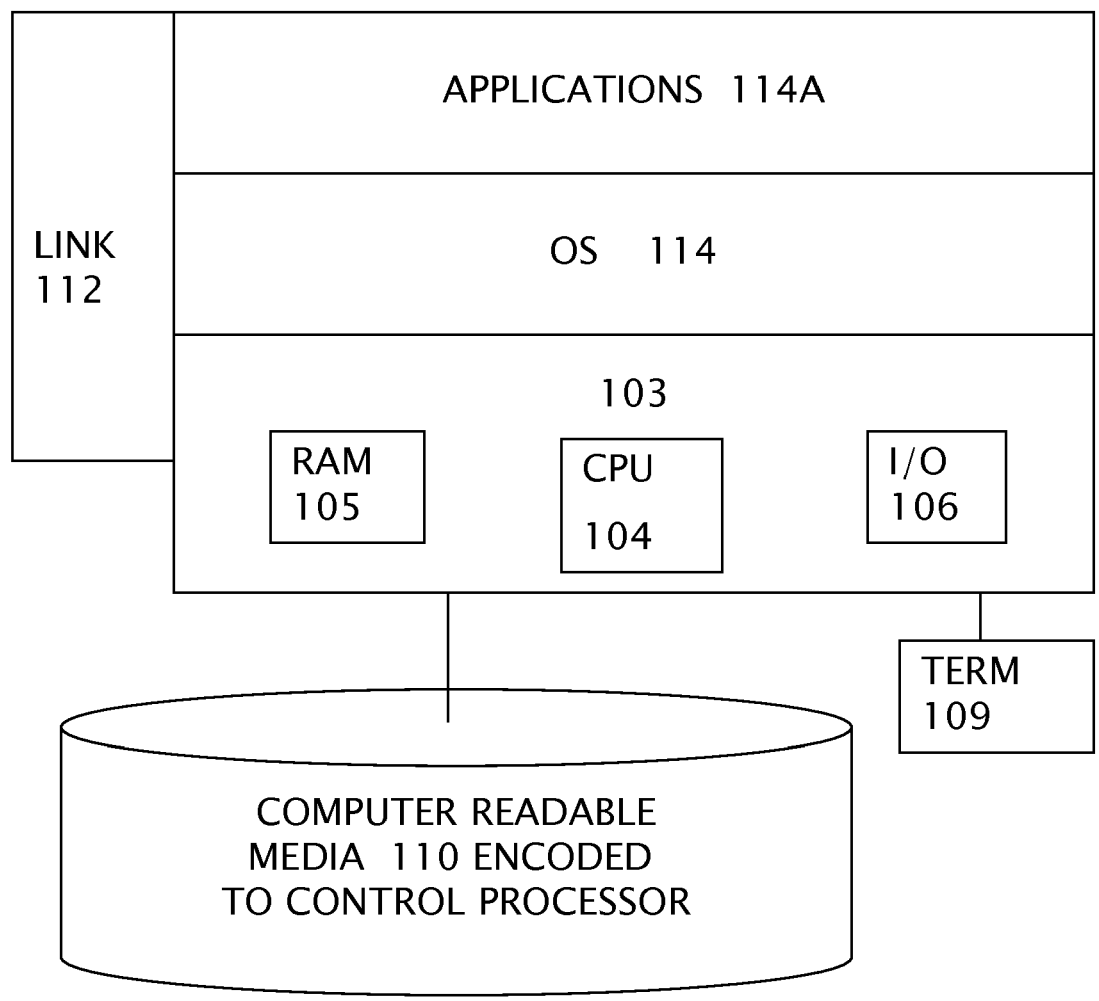
FIG. 1 is a processor adapted to operate as a circuit as embodiments.

FIG. 1 shows a block diagram of a typical computing system 100 where the preferred embodiment of this invention can be practiced. The computer system 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Microinstruction code 107, may also be included on the platform 102. Various peripheral components may be connected to the computer platform 102. Typically provided peripheral components include an external data storage device (e.g. flash, tape or disk) 110 where the data used by the preferred embodiment is stored. A link 112 may also be included to connect the system 100 to one or more other similar computer systems. The link 112 may also provide access to the global Internet. An operating system (OS) 114 coordinates the operation of the various components of the computer system 100, and is also responsible for managing various objects and files, and for recording certain information regarding same. Lying above the OS 114 is a software tools layer 114A containing, for example, compilers, interpreters and other software tools. The interpreters, compilers and other tools in the layer 114A run above the operating system and enable the execution of programs using the methods known to the art.

An example of a suitable CPU is a Xeon™ processor (trademark of the Intel Corporation); examples of an operating systems is GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 2:
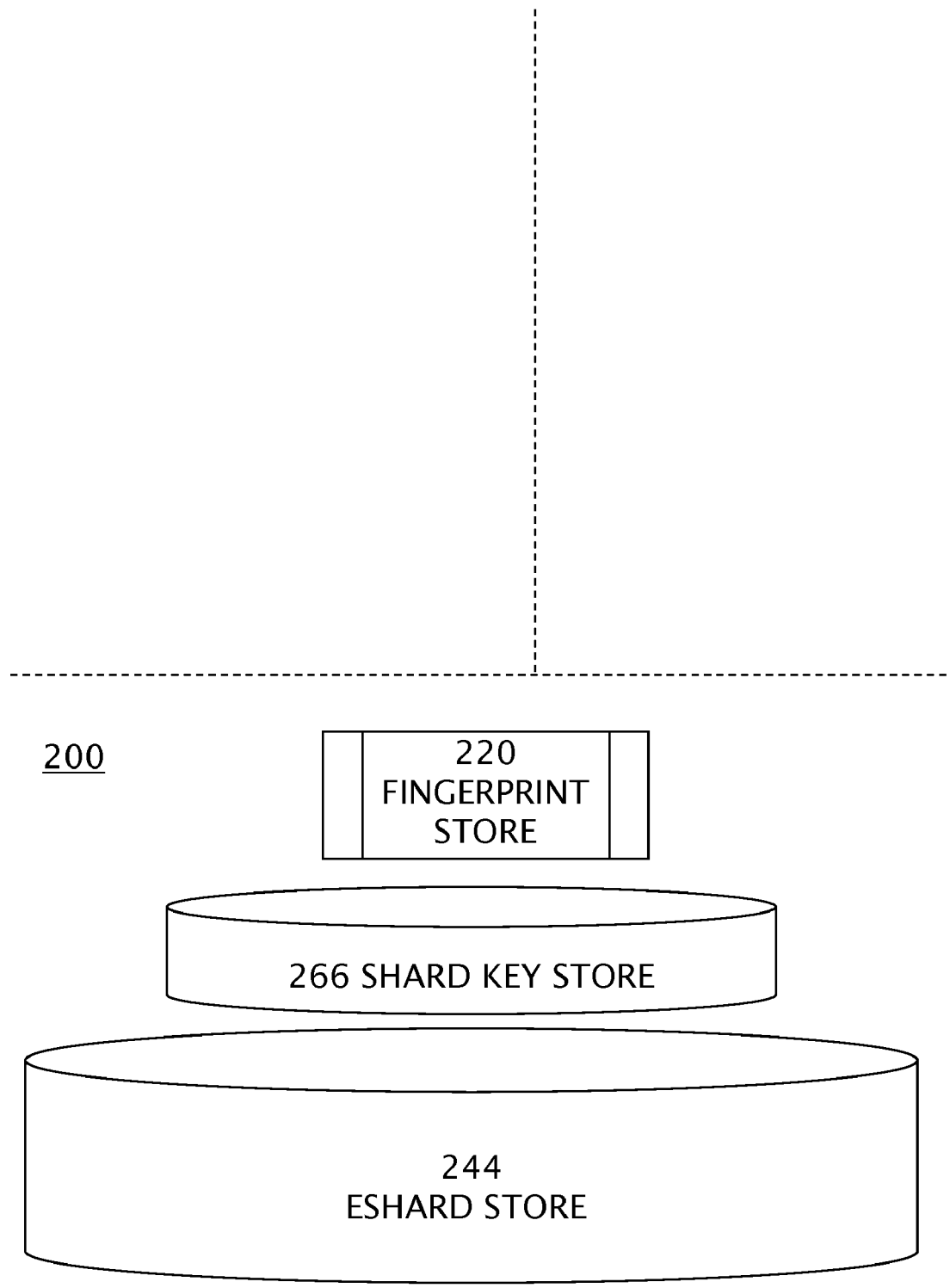
FIG. 2 is block diagram of significant systems of an apparatus of the present invention.

FIG. 2 is block diagram of a storage apparatus 200 of the present invention comprising a fingerprint store 220, a shard key store 266, and an eshard store 244. It is understood that the term store includes a computer readable media and circuits for writing into and reading from said computer readable media and logic for determining if certain data is already encoded on said computer readable media and circuits for a network interface and receiving queries and sending replies, on the data stored in the various stores. The present patent application defines a shard as an arbitrary portion of a data object selected without regard to any natural organization of the data. Non-limiting examples of data objects include files, databases, email, email attachments, and disk images. A data file for example is broken into a number of shards without any semantic meaning. A fingerprint is the result of a computation on each shard which serves as a unique identification. An eshard is a shard which has been encrypted. In an embodiment, a random key is chosen for the encryption of a shard into an eshard. In an embodiment, said random key is further encrypted and stored as a shard key. In an embodiment, said random key is deleted after a strong encryption algorithm using a public key of a key pair generates a shard key. A fingerprint store records the presence or absence of an encrypted shard in the eshard store.

Figure 3:
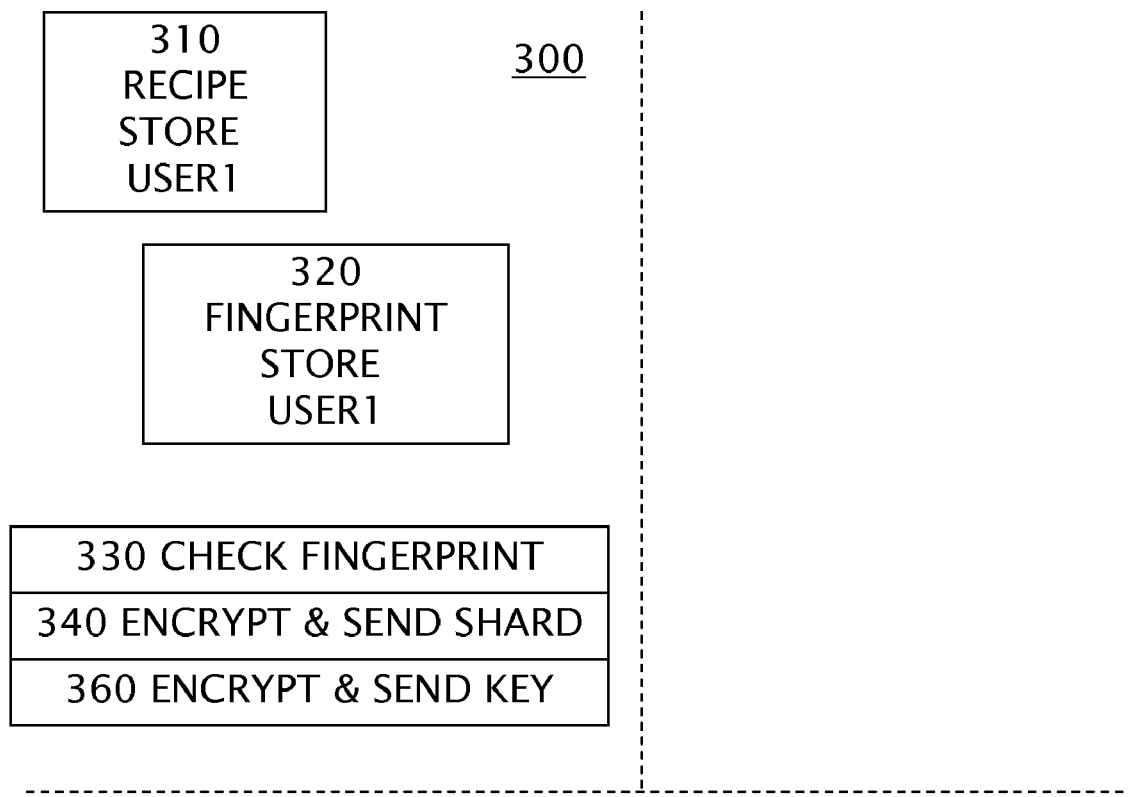
FIG. 3 is block diagram of significant systems of an apparatus of the present invention.

FIG. 3 is block diagram of significant systems of a user terminal apparatus 300 of the present invention comprising a recipe store 310 for user1, a fingerprint store 320 for user1 and circuits comprising a circuit 330 to check and report on a fingerprint with respect to apparatus 200, a circuit 340 to encrypt and send a shard to apparatus 200, and a circuit 360 to encrypt and send a key to apparatus 200. It is understood that the apparatus has suitable ancillary circuits for interfacing to a network, sending and receiving information, controlling its operations, and supporting users with input and output devices of conventional design and operation. It is known that embodiments of circuits are implemented in a processor by software control.

Figure 4:
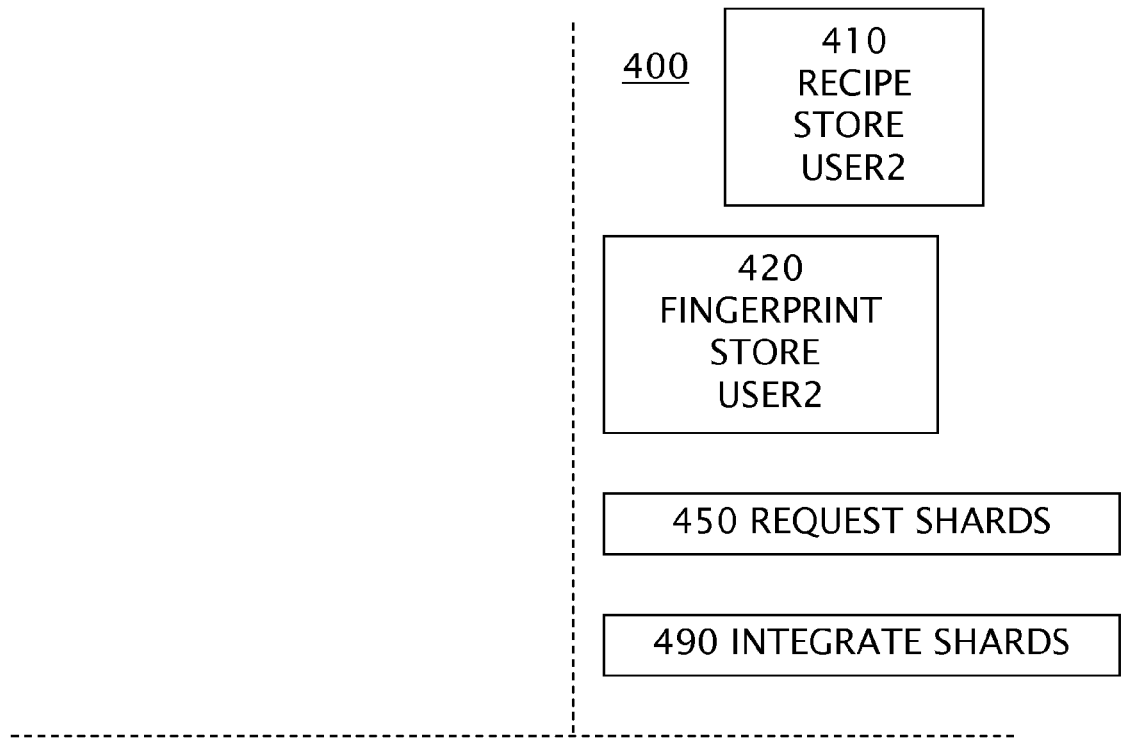
FIG. 4 is block diagram of significant systems of an apparatus of the present invention.

FIG. 4 is block diagram of significant systems of a user terminal apparatus 400 of the present invention. The user terminal comprises a user2 recipe store 410, a user2 fingerprint store 420 and a circuit to request a plurality of shards 450, and a circuit to integrate shards 490 back into the files or data objects they comprise according to a recipe found in a recipe store 410. A request is made by sending a plurality of fingerprints to an apparatus 200 each fingerprint corresponding to a shard required by at least one recipe.

Figure 5:
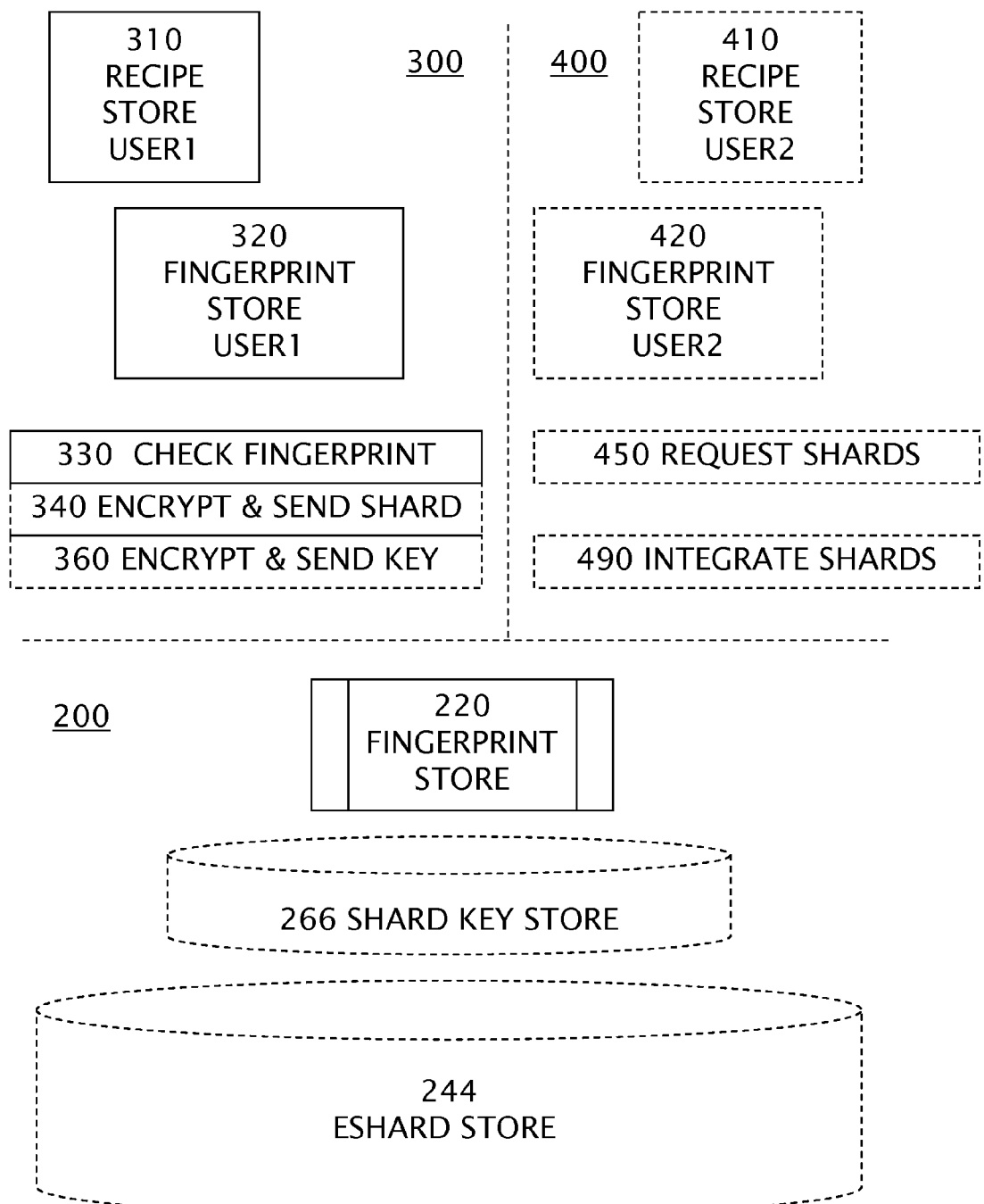
FIG. 5 illustrates a process and dataflow in a first method of operating the disclosed apparatus.

FIG. 5 illustrates a process and dataflow in a first method of operating the disclosed apparatus. A data object is disassembled into a plurality of shards. A recipe is determined for reassembling the shards into the data object. The recipe is stored in recipe store 310 for user1. Each shard is processed to compute a fingerprint which is stored in fingerprint store 320 for user1. A circuit 330 to check fingerprint submits a query to a fingerprint store 220 in apparatus 200. If the fingerprint store indicates that the shard is already stored on apparatus 200 in its eshard store 244, no further action is required and the method proceeds to check any remaining fingerprints in fingerprint store 320 for user1.

Figure 6:
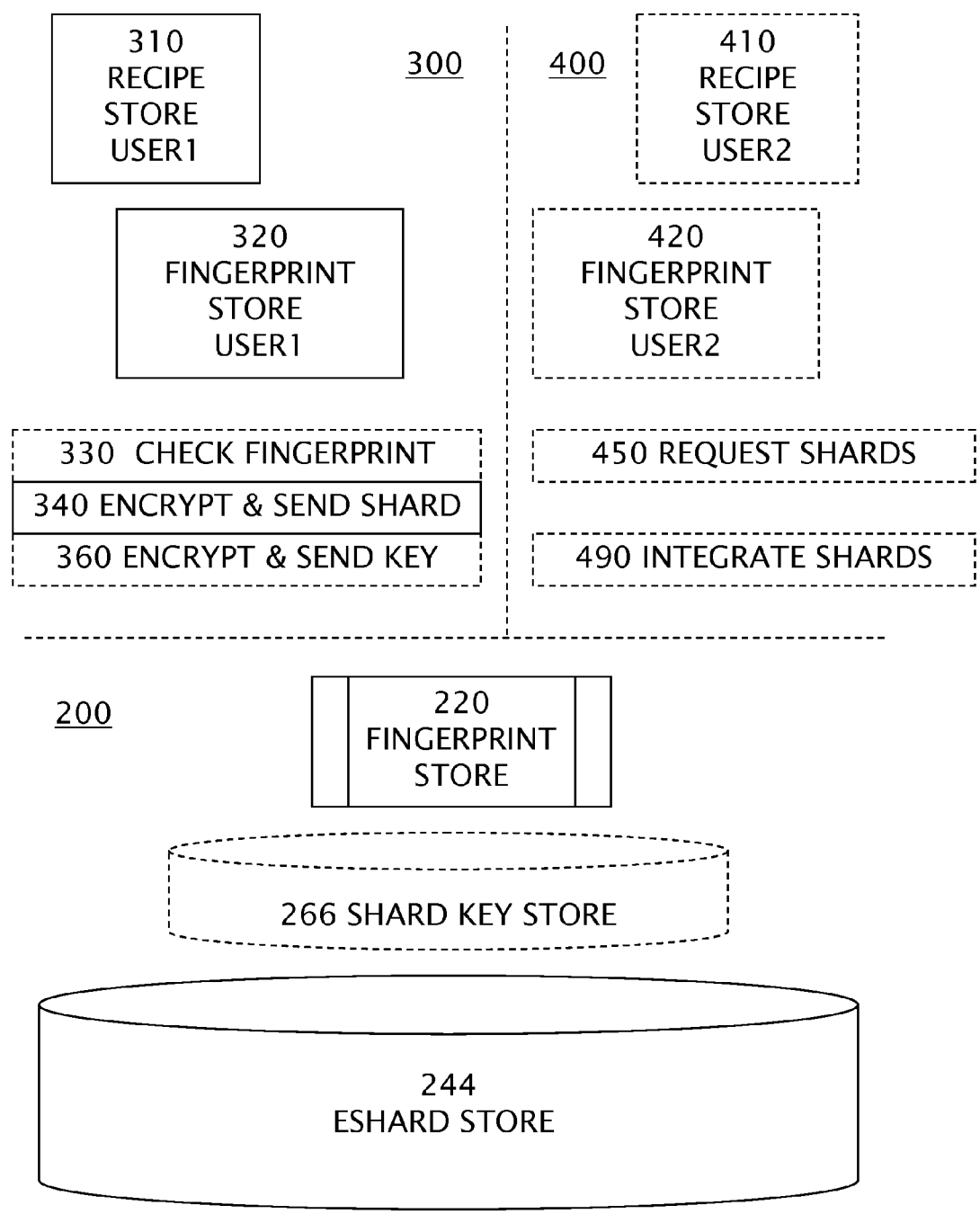
FIG. 6 illustrates a process and dataflow in a first method of operating the disclosed apparatus.

FIG. 6 illustrates a process and dataflow in a method of operating the circuit 340 to encrypt & send a shard which is activated if the fingerprint store 220 of the storage apparatus 200 indicates that the shard is not already stored. A key is randomly generated to encrypt the shard. In an embodiment, a symmetrical key encryption algorithm is chosen. A randomly generated key minimizes the probability that the random key could be guessed or that two shards from the same data object will have similar properties. The result of the encryption is an eshard which is transmitted to and stored in eshard store 244.

Figure 7:
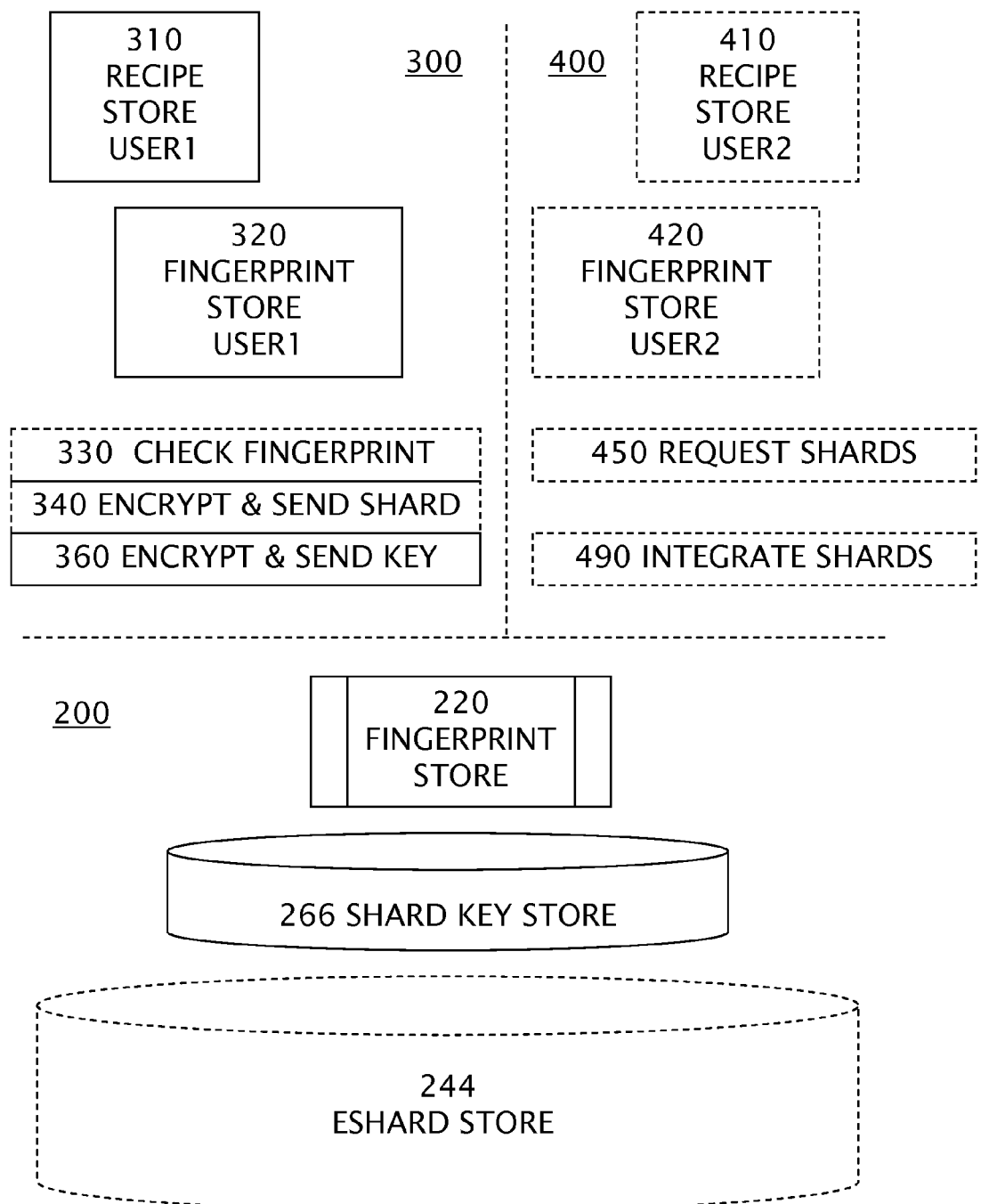
FIG. 7 illustrates a process and dataflow in a first method of operating the disclosed apparatus.

FIG. 7 illustrates a process and dataflow in a method of operating a circuit 360 to encrypt and send key. The random key used for each shard encryption is subsequently itself encrypted. In an embodiment, a public key is used with an asymmetrical encryption process. The result of encrypting a random key used for creating an eshard is a shard key. Circuit 340 transmits each shard key to apparatus 200 where it is stored in shard key store 266. When a shard key has been successfully transmitted to shard key store 266, the random key is deleted. Without the private key of the key pair used to strongly encrypt the random key, there is no value to keeping the shard key within user terminal apparatus 300 so it is deleted. When the encrypted shard has been successfully transmitted to eshard store 244, there is no value to retaining an eshard within user terminal apparatus 300 so each encrypted shard can be deleted after transmittal.

Figure 8:
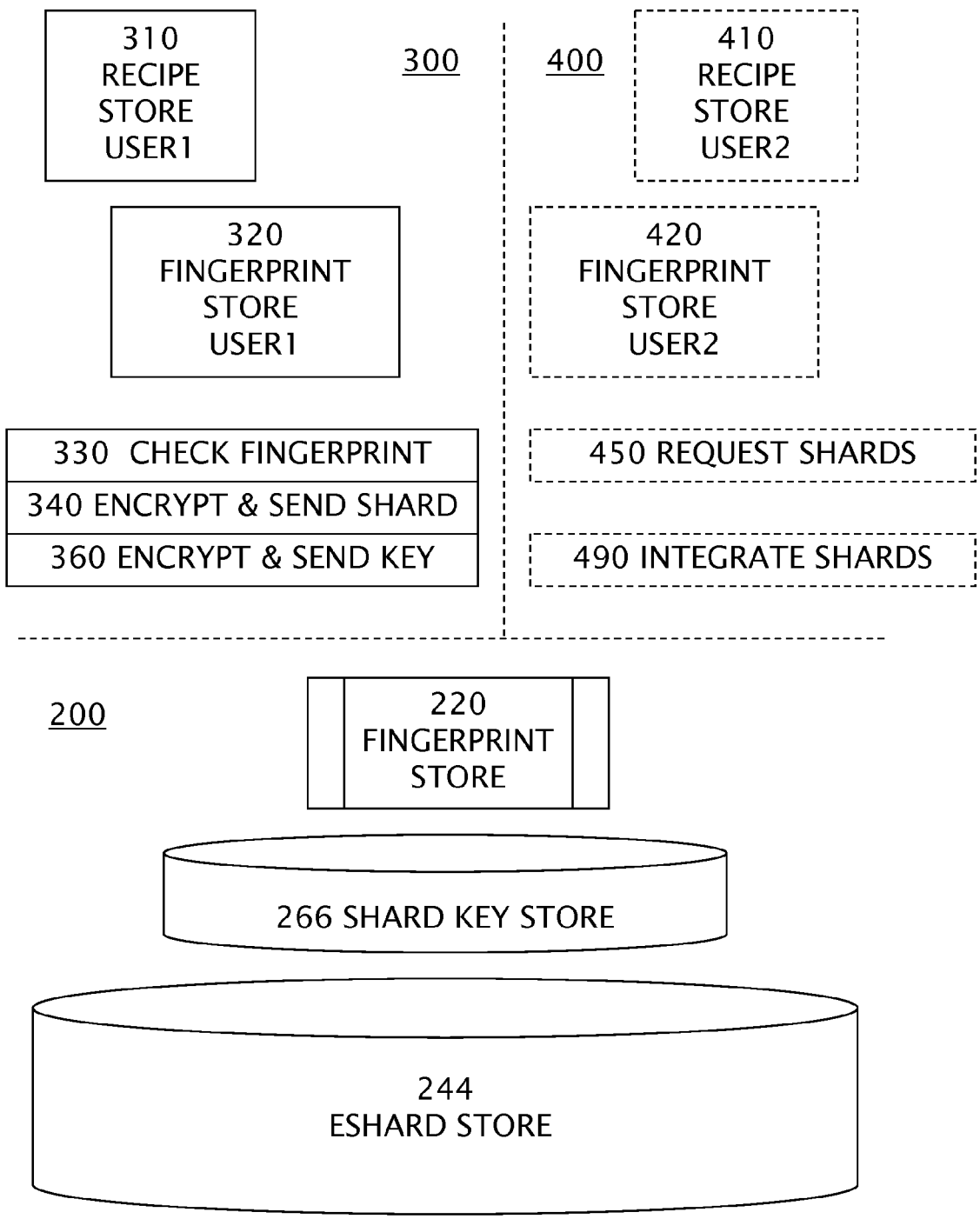
FIG. 8 illustrates key concepts in a first mode of operating the disclosed apparatus.

FIG. 8 illustrates key concepts in a first mode of operating the disclosed apparatus. The present invention comprises the method of operating an apparatus comprising a recipe store 310, a fingerprint store 320, a circuit 330 to check fingerprints, a fingerprint store 220, a circuit 340 to encrypt and send shards, an eshard store 244, a circuit to encrypt and send keys 360, and a shard key store 266; the method comprising the steps of disassembling a data object in an example a file, into a plurality of shards, determining a recipe for reassembling the shards into a data object and storing the recipe in a recipe store 310, computing a fingerprint for each shard and storing the fingerprint into a fingerprint store 320, checking a fingerprint in a fingerprint store 220 of a storage apparatus for a shard having been previously stored, and proceeding to the next fingerprint if it has been previously stored, on the condition that the shard related to a fingerprint has not been yet stored in fingerprint store 220, selecting a random key, encrypting the shard, and sending the resulting eshard to the storage apparatus 200 and storing into eshard store 244.

The method further comprises generating a shard key by using a public key to encrypt the random key used for creating each eshard and transmitting the resulting shard key to be stored in shard key store 266 of storage apparatus 200, deleting the random key, and deleting each shard key immediately after successful transmission.

Figure 9:
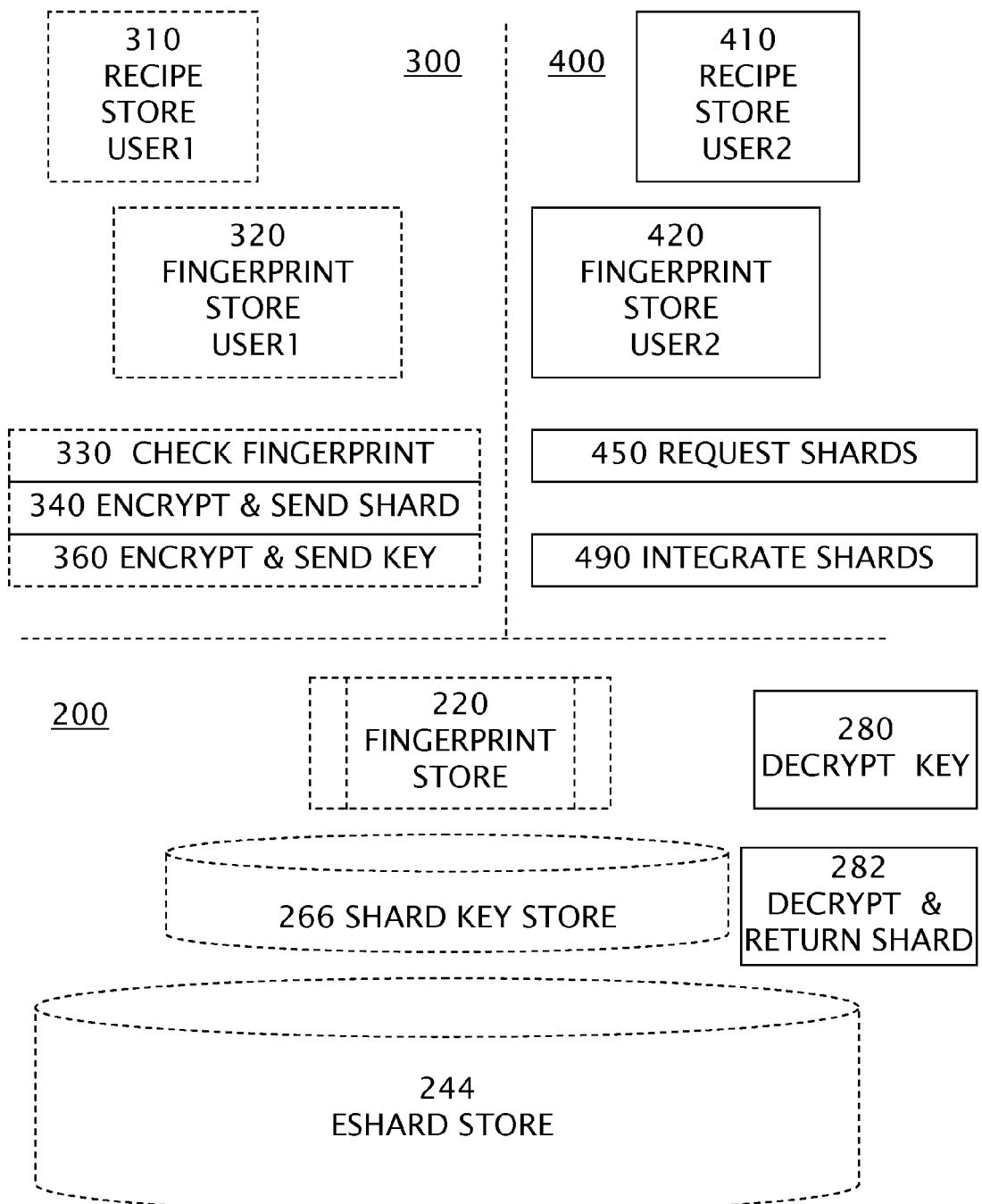
FIG. 9 illustrates a process and dataflow in a second method of operating the disclosed apparatus.

FIG. 9 illustrates an apparatus used in a second method of operating the disclosed apparatus comprising a circuit 450 to request shards, and a circuit 490 to integrate shards back into data objects as well as a recipe store and a fingerprint store. The apparatus further comprises a circuit 280 to decrypt the shard key in response to a request, and a circuit 282 to decrypt the eshard and return the resulting shard through the network interface to the source of a request.

Figure 10:
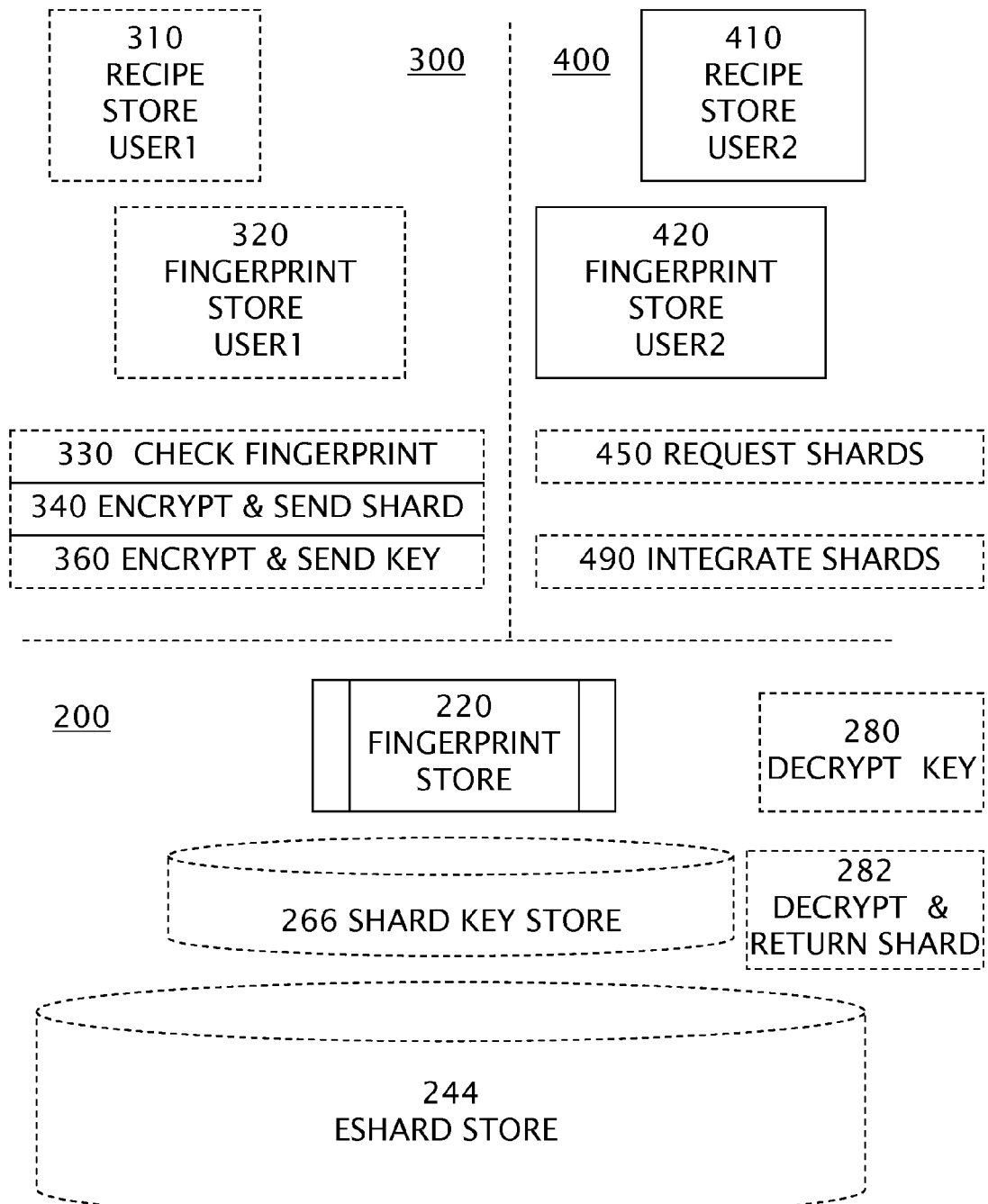
FIG. 10 illustrates a process and dataflow in a second method of operating the disclosed apparatus.

FIG. 10 illustrates a key concept in a second method of operating the disclosed apparatus. It is particularly pointed out that the use of fingerprint store 220 serves to de-duplicate potential storage of identical shards and even between user1 on a first apparatus 300 and an unaffiliated user2 on a second apparatus 400. It even eliminates the need to encrypt and send an eshard and encrypt and send a shard key a second time. In an example for illustration, every fingerprint stored in fingerprint store 420 of user2 will be found in fingerprint store 220 of storage apparatus 200 whether it was originally stored by apparatus 300, apparatus 400, or another. The use of shards and fingerprinting each shard allows for significant disk savings even if every single file of each user was slightly different from every single file of every other user. Furthermore it addresses limitations on the size of files and file transfers and file comparisons.

Figure 11:
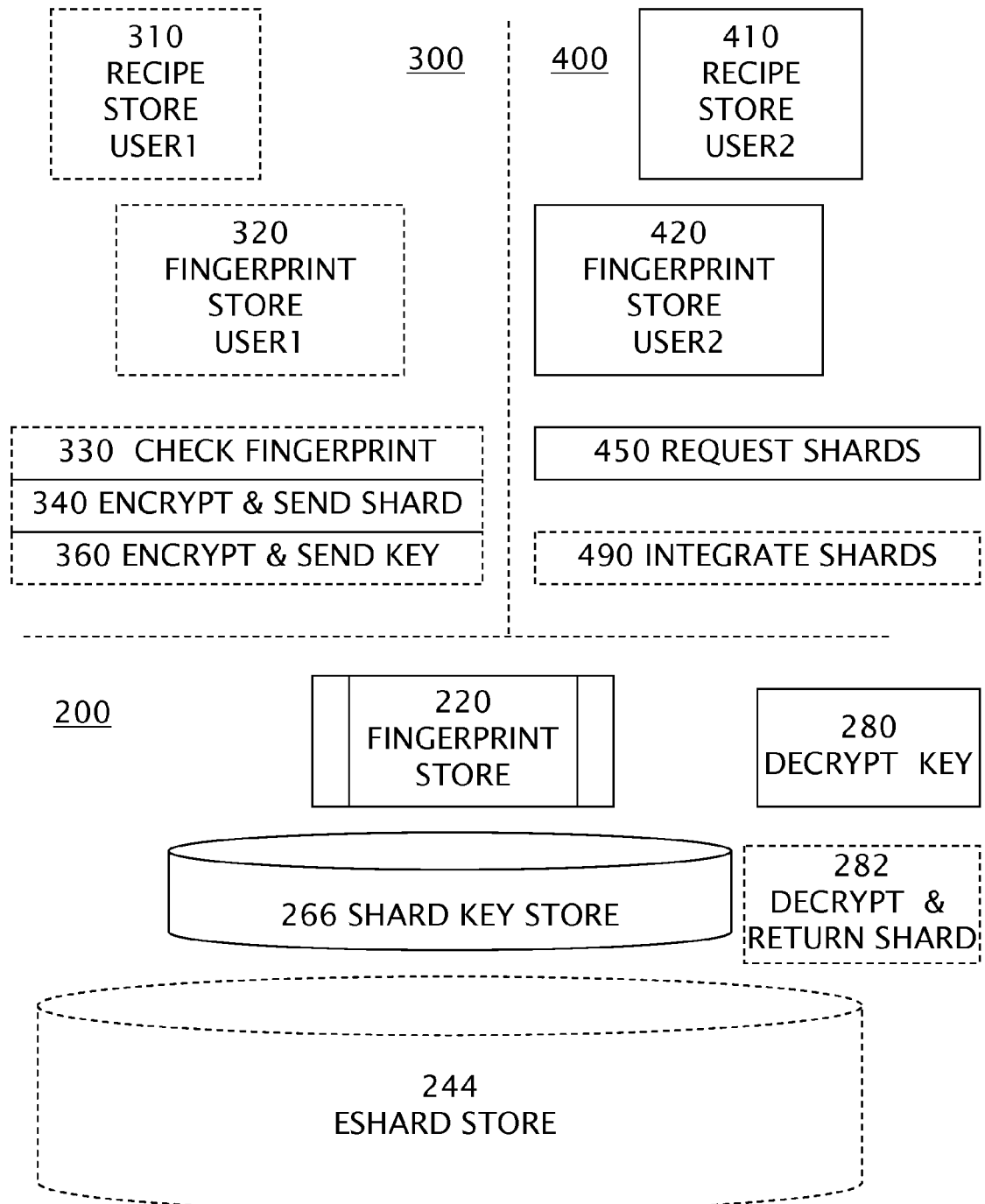
FIG. 11 illustrates a process and dataflow in a second method of operating the disclosed apparatus.

FIG. 11 illustrates the process and dataflow in a second method of operating the disclosed apparatus. The method of operating an apparatus 400 to retrieve one or more data objects from a storage apparatus 200 begins with reading a recipe store 410 to determine the fingerprints for the shards needed. A group of fingerprints is presented to a fingerprint store 220 which identifies each eshard and its related shard key. Each shard key is read from shard key store 266 and presented to a circuit 280 for decrypting a key by applying a private key to an asymmetrical encryption circuit. Only the public key is distributed to any user and thus the random keys used to encrypt the shards for transmission and storage are inaccessible to any user. Nor are the random keys stored anywhere but only provided to a decryption circuit 282, used therein, and then deleted.

Figure 12:
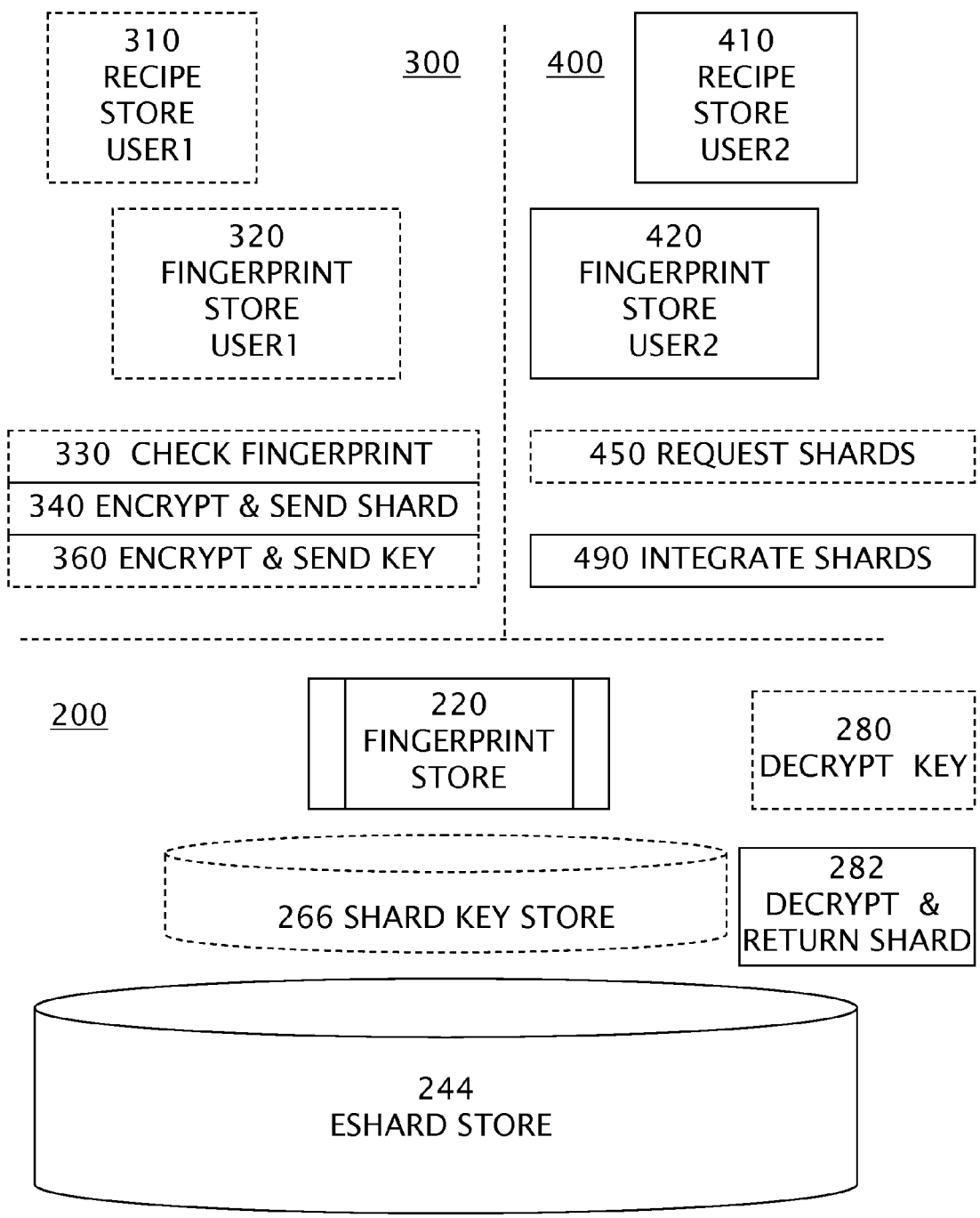
FIG. 12 illustrates a process and dataflow in a second method of operating the disclosed apparatus.

FIG. 12 illustrates a process and dataflow in a method of operating the circuit 282 to decrypt and return a shard for integration. The fingerprint store 220 associates each eshard with its random key and both are submitted to the circuit 282 to decrypt and send the shard to a circuit 490 to integrate shards according to the recipe in recipe store 410. Shards are transmitted in no particular order and have no inherent structure so that without the recipe, reassembling the shards into a data object is non-trivial. In an embodiment, shards are returned from storage apparatus 200 to user terminal apparatus 400 through an encrypted channel such as SSL or VPN.

Figure 13:
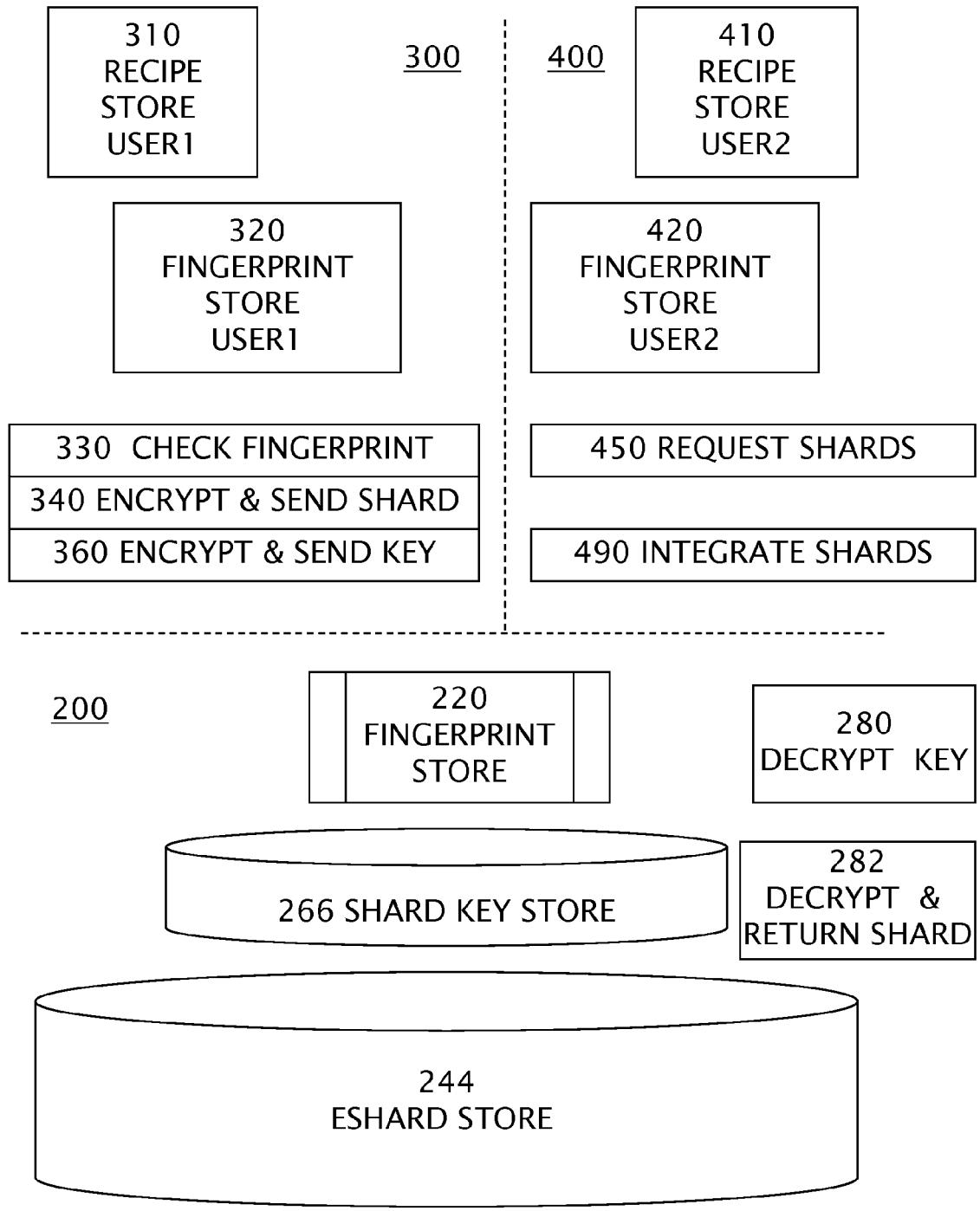
FIG. 13 illustrates a preferred embodiment of the disclosed apparatus.

FIG. 13 illustrates a preferred embodiment of the disclosed apparatus. A multi-user shared storage apparatus 200 comprises a fingerprint store 220 coupled to a shard key store 266, the shard key store, the shard key store coupled to an eshard store 244, the eshard store, the eshard store coupled to a circuit 282 to decrypt and send a shard, the circuit 282, the circuit 282 coupled to a circuit 280 to decrypt a key, the circuit 280, the circuit 280 coupled to the shard key store and conventional known ancillary circuits for network interface, a processor for controlling the apparatus, and circuits for determining if a fingerprint is found in the fingerprint store and receiving and replying to queries thereof, the network interface coupled to a network, and the network coupled to a first user terminal apparatus 300 and further coupled to a second user terminal apparatus 400. The first user terminal apparatus adapted to write into the storage apparatus under the control of a processor comprises a recipe store 310 for data objects of user1, the recipe store, the recipe store coupled to a fingerprint store 320 for shards disassembled from data objects of user1, the fingerprint store coupled to a circuit 330 to check fingerprint for prior use or non-use in fingerprint store 220 of storage apparatus 200, the fingerprint store coupled to a circuit 340 to encrypt and send a shard to eshard store 244 if the shard is not already stored, the circuit 340 generating a random key for encrypting & sending the shard, and the circuit 340 coupled to a circuit 360 to encrypt and send the random key to shard key store 266. In an embodiment a random key is used for symmetrical encryption and each random key is encrypted asymmetrically with a public key corresponding to a private key to be restricted to the storage apparatus. The random key is deleted after the shard key is transmitted to shard key store 266. The second user terminal adapted to read from the storage apparatus comprises a recipe store 410 for data objects of user2, the recipe store coupled to a fingerprint store 420 for shards of user2, and the fingerprint store coupled to a circuit 450 to request shards from the storage apparatus. The recipe store 410 is further coupled to a circuit 490 to integrate shards back into data objects. The fingerprint store, the circuit to request shards, and the circuit to integrate shards all coupled to a network interface whereby they can transmit to and receive from the storage apparatus.

The present invention enables restoration of complete disk images for disaster recovery in addition to file version control and backup.

CONCLUSION

It is particularly pointed out that the use of fingerprint store 220 serves to de-duplicate potential storage of identical shards and even between user1 on a first apparatus 300 and an unaffiliated user2 on a second apparatus 400. It even eliminates the need to encrypt and transmit an eshard and encrypt and transmit a shard key if the shards are identical. Every fingerprint stored in fingerprint store 420 of user2 will be found in fingerprint store 220 of storage apparatus 200 whether it was originally stored by apparatus 300, apparatus 400, or another. The use of shards and fingerprinting each shard allows for significant disk savings even if every single file of each user was slightly different from every single file of every other user. Furthermore the present invention addresses limitations on the size of files and file transfers and file comparisons which limit conventional backup solution deployment across public networks.

It is particularly pointed out that the random keys are not stored and are specifically deleted after use. In apparatus 300 a random key is generated to encrypt a shard into an eshard and used in generating a shard key in combination with a public key. It is then deleted. In apparatus 200 a random key for use in decrypting an eshard is recovered by decrypting a shard key by using a private key. After the eshard is decrypted and successfully transmitted to apparatus 400, the random key used in decrypting the eshard is not stored and specifically deleted. The present invention is distinguished from conventional file backup and offsite storage by reduced duplicative data transfer, improved security, and superior granularity. It provides high end data center capacity and security to small and medium sized enterprises with shared usage to lower each customer's cost of operation and management. It is particularly pointed out that the apparatus de-duplicates storage and data transmission by operating on the fingerprints of shards which are distinguished from files. It is particularly pointed out that each eshard is encrypted with a randomly selected random key and that each random key is encrypted with a public/private key encryption algorithm. No user has access to random keys or to the private key necessary to recover a random key. Users without common files benefit from de-duplication of shards and enjoy savings in encryption, data transmission, storage and use of public networks and servers operated by independent providers for unaffiliated customers.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An apparatus for multi-user shared storage comprising:
 a fingerprint store coupled to a shard key store,
 the shard key store, the shard key store coupled to an eshard store,
 the eshard store, the eshard store coupled to a circuit for to decrypt and send a shard to any one of a plurality of user terminals coupled to a wide area network,
 the circuit for to decrypt and send a shard, the circuit for to decrypt and send a shard coupled to a circuit for to decrypt a shard key,
 the circuit for to decrypt a shard key, the circuit for to decrypt a shard key coupled to the shard key store,
 conventional known ancillary circuits for network interface for coupling to a wide area network, receiving and storing fingerprints, eshards, and shard keys,
 circuits for determining if a fingerprint is found in the fingerprint store and receiving and replying to queries thereof,
 wherein the eshard store comprises a non-transitory computer-readable media encoded with a plurality of shards, portions of a data object, which have been encrypted with a randomly generated key, the shard key store comprises a non-transitory computer-readable media encoded with the randomly generated keys further encrypted by a public key of the multi-user storage apparatus, the fingerprint store is a non-transitory computer readable media encoded with a fingerprint computed on each of the shards, portions of a data object, and
 a processor and a memory for controlling the apparatus.

2. A user terminal apparatus comprising:
a recipe store for data objects of a first user, the recipe store coupled to a fingerprint store for shards disassembled from data objects of the first user,
the fingerprint store for data objects of the first user coupled to a circuit for to transmit a query to a multi-user shared storage apparatus via a network interface, and
said circuit to transmit a query whereby a plurality of fingerprints stored in the fingerprint store of the user terminal may be determined to already exist on the multi-user shared storage apparatus or not,
a circuit for to generate a random key for encrypting each shard when the circuit to transmit a query to the multi-user shared storage apparatus determines which fingerprints of shards have not previously been stored on the multi-user shared storage apparatus,
an encryption circuit to encrypt a shard using a random key whereby an eshard is produced,
a transmission circuit to transmit the eshard and its fingerprint to the multi-user shared storage apparatus,
a circuit for to encrypt the random key into a shard key, to transmit the shard key to shard key store of the multi-user shared storage apparatus, and to delete the random key after successful transmission, whereby the random key is used for symmetrical encryption and each random key is encrypted asymmetrically with a public key which public key corresponds to a private key restricted to the multi-user shared storage apparatus whereby the shard is transmitted to and stored at the multi-user shared storage in the encrypted eshard format and the random key is never transmitted over the network,
wherein the recipe store is a non-transitory computer-readable media encoded with the order and structure of the shards which make up a data object and reassembly enabling information, the fingerprint store is a non-transitory computer readable media encoded with a fingerprint computed on each of the shards, portions of a data object, and
a processor and a memory for controlling the apparatus.

3. A user terminal apparatus comprising:
a recipe store for data objects previously stored by a first user, the recipe store coupled to a fingerprint store for shards disassembled from data objects previously stored by the first user,
the fingerprint store for data objects of the first user coupled to a circuit for to transmit a query to a multi-user shared storage apparatus via a network interface,
said circuit to transmit a query whereby a plurality of fingerprints stored in the fingerprint store of the user terminal may be determined to already exist on the multi-user shared storage apparatus or not,
the fingerprint store coupled to a circuit for to request shards from a multi-user storage apparatus remotely located on a wide area network,
the circuit to request shards, and the recipe store further coupled to
a circuit for to receive shards from the multi-user storage apparatus in any order and integrate shards back into data objects, wherein the fingerprint store, the circuit for to request shards, and the circuit for to integrate shards are all coupled to
a network interface whereby they can transmit to and receive from the multi-user storage apparatus through a secure channel or protocol,
wherein the recipe store is a non-transitory computer-readable media encoded with the order and structure of the shards which make up a data object and reassembly enabling information, the fingerprint store is a non-transitory computer readable media encoded with a fingerprint computed on each of the shards, portions of a data object, and
a processor and a memory for controlling the apparatus.

4. A method for operating a user terminal, the method comprising:
a method to backup a data object of a first user, the method comprising:
disassembling a data object into a plurality of shards,
determining a recipe for reassembling the shards into a data object by encoding the order and structure of the shards which make up a data object and the reassembly enabling information,
storing the recipe in a recipe store,
computing a fingerprint for each shard and
storing the fingerprint into a fingerprint store,
transmitting the fingerprint to a multi-user shared storage apparatus to query if a shard has been previously stored, on the condition that the shard related to a fingerprint has not been yet stored,
generating a random key,
encrypting the shard by the random key,
transmitting the resulting eshard to the multi-user shared storage apparatus via a wide area public network,
using a public key of the multi-user storage apparatus to encrypt the random key to generate a resulting shard key for each eshard,
transmitting the shard key to a multi-user storage apparatus via a wide area public network,
deleting the random key after successful transmission of the shard key; and
a method to restore a desired data object of a first user, the method comprising:
reading a recipe of previously stored data objects of the first user from a recipe store to determine fingerprints for shards needed,
transmitting a plurality of fingerprints as a request for shard transmission to a multi-user storage apparatus through a wide area public network,
receiving a plurality of decrypted shards in any order through a secure channel from the multi-user storage apparatus, and
integrating the shards into the first user's desired data object according to the recipe previously stored into recipe store during backup of the data object.

5. A method for operating a multi-user storage apparatus on a wide area public network to respond to a request from a user terminal to restore a desired data object of a first user, comprising:
receiving a plurality of fingerprints from the user terminal,
presenting the plurality of fingerprints to a fingerprint store which identifies each eshard and its related shard key,
reading each shard key from shard key store,
decrypting a random key by applying a private key and a shard key to an asymmetrical encryption circuit,
submitting each eshard and its random key to a circuit for to decrypt into a shard, and
transmitting said shard from the multi-user shared storage apparatus to the user terminal through an encrypted channel;
and in response to a request from a user terminal to backup a data object of a first user, the method further comprising:
receiving a query from the user terminal as to the presence or absence of at least one eshard in eshard store wherein the query comprises at least one fingerprint computed on a shard of the data object;

determining if the fingerprint received from the user terminal has been previously stored into fingerprint store;

replying to the query from the user terminal that a fingerprint of the query is or is not previously stored in fingerprint store;

receiving an eshard transmitted from the user terminal and storing it into eshard store;

receiving a shard key transmitted from the user terminal and storing it into shard key store;

receiving a fingerprint transmitted from the user terminal and storing it into fingerprint store; and confirming successful transmission of the eshard, the shard key, and the fingerprint to the user terminal, whereby bandwidth is conserved by eliminating duplicate transmission of shards which have been previously stored by another user of the multi-user storage apparatus.

* * * * *